(12) United States Patent
Steidlmayer et al.

(10) Patent No.: US 8,577,781 B2
(45) Date of Patent: Nov. 5, 2013

(54) METHOD FOR SCHEDULING FUTURE ORDERS ON AN ELECTRONIC COMMODITY TRADING SYSTEM

(75) Inventors: Pete Steidlmayer, Wilmette, IL (US); Nate Ostrye, North Aurora, IL (US); Andrew W. Busby, Aurora, IL (US)

(73) Assignee: Cunningham Trading Systems, LLC, Chicago, IL (US)

( * ) Notice: Subject to any disclaimer, the term of this patent is extended or adjusted under 35 U.S.C. 154(b) by 561 days.

(21) Appl. No.: 12/629,471

(22) Filed: Dec. 2, 2009

(65) Prior Publication Data

US 2010/0145844 A1    Jun. 10, 2010

Related U.S. Application Data

(63) Continuation of application No. 11/624,077, filed on Jan. 17, 2007, now abandoned.

(51) Int. Cl.
*G06Q 40/00*    (2012.01)

(52) U.S. Cl.
USPC ............................................. 705/37; 705/35

(58) Field of Classification Search
USPC .................................................... 705/37, 35
See application file for complete search history.

(56) References Cited

U.S. PATENT DOCUMENTS

| | | | |
|---|---|---|---|
| 4,674,044 A | 6/1987 | Kalmus et al. | |
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,202,827 A | 4/1993 | Sober | |
| 5,243,331 A | 9/1993 | McCausland et al. | |
| 5,270,922 A | 12/1993 | Higgins | |
| 5,293,172 A | 3/1994 | Lamberty et al. | |
| 5,297,031 A | 3/1994 | Gutterman et al. | |
| 5,297,032 A | 3/1994 | Trojan et al. | |
| 5,628,052 A | 5/1997 | DeSantis et al. | |
| 5,689,651 A | 11/1997 | Lozman | |

(Continued)

FOREIGN PATENT DOCUMENTS

| | | |
|---|---|---|
| EP | 1 067 471 | 1/2001 |
| WO | WO 95/26005 | 9/1995 |

(Continued)

OTHER PUBLICATIONS

Carey, Theresa W; "The electronic investor: Exploring all options"; Barron's; Oct. 29, 2001.*

(Continued)

*Primary Examiner* — Edward Chang
(74) *Attorney, Agent, or Firm* — McGuireWoods LLP

(57) ABSTRACT

A method is provided for placing a trade order for a commodity on an electronic exchange to be executed at a future time, said method comprising the steps of displaying a trading screen for a commodity market, said trading screen including a future time schedule and an order entry region corresponding to each future time segment of the future time schedule, and scheduling an order corresponding to a future time segment by locating a pointer of a user device within an order entry region corresponding to the future time segment and sending an input signal via the pointer.

13 Claims, 9 Drawing Sheets

(56) References Cited

U.S. PATENT DOCUMENTS

| | | |
|---|---|---|
| 5,774,877 A | 6/1998 | Patterson, Jr. et al. |
| 5,793,301 A | 8/1998 | Patterson, Jr. et al. |
| 5,797,002 A | 8/1998 | Patterson, Jr. et al. |
| 5,812,935 A | 9/1998 | Kay |
| 5,845,266 A | 12/1998 | Lupien et al. |
| 5,873,071 A | 2/1999 | Ferstenberg et al. |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,667 A | 8/1999 | Tull, Jr. et al. |
| 5,963,923 A | 10/1999 | Garber |
| 5,970,061 A | 10/1999 | Koludo |
| 6,005,530 A | 12/1999 | Jovanovich |
| 6,006,075 A | 12/1999 | Smith et al. |
| 6,012,046 A | 1/2000 | Lupien et al. |
| 6,014,643 A | 1/2000 | Minton |
| 6,035,218 A | 3/2000 | Oh et al. |
| 6,035,287 A | 3/2000 | Stallaert et al. |
| 6,098,051 A | 8/2000 | Lupien et al. |
| 6,108,323 A | 8/2000 | Gray |
| 6,131,087 A | 10/2000 | Luke et al. |
| 6,134,535 A | 10/2000 | Belzberg |
| 6,195,103 B1 | 2/2001 | Stewart |
| 6,195,647 B1 | 2/2001 | Martyn et al. |
| 6,211,880 B1 | 4/2001 | Impink, Jr. |
| 6,272,474 B1 | 8/2001 | Garcia |
| 6,278,982 B1 | 8/2001 | Korhammer et al. |
| 6,282,521 B1 | 8/2001 | Howorka |
| 6,317,728 B1 | 11/2001 | Kane |
| 6,338,047 B1 | 1/2002 | Wallman |
| 6,433,737 B2 | 8/2002 | Katz |
| 6,515,635 B2 | 2/2003 | Chiang |
| 6,598,029 B1 | 7/2003 | Johnson et al. |
| 6,600,918 B1 | 7/2003 | Youngs et al. |
| 6,600,934 B1 | 7/2003 | Yun et al. |
| 6,609,012 B1 | 8/2003 | Malmgren et al. |
| 6,611,695 B1 | 8/2003 | Periyalwar |
| 6,611,862 B2 | 8/2003 | Reisman |
| 6,697,642 B1 | 2/2004 | Thomas |
| 6,731,905 B2 | 5/2004 | Ogino et al. |
| 6,751,480 B2 | 6/2004 | Koglantis et al. |
| 6,754,639 B2 | 6/2004 | Ginsberg |
| 6,766,304 B2 | 7/2004 | Kemp, II et al. |
| 6,772,132 B1 | 8/2004 | Kemp et al. |
| 6,795,018 B2 | 9/2004 | Guo |
| 6,801,790 B2 | 10/2004 | Rudrapatna |
| 6,834,198 B1 | 12/2004 | Hachenberger et al. |
| 6,938,011 B1 | 8/2005 | Kemp, II et al. |
| 7,124,110 B1 | 10/2006 | Kemp et al. |
| 7,127,424 B2 | 10/2006 | Kemp, II et al. |
| 7,212,999 B2 | 5/2007 | Friesen et al. |
| 7,243,083 B2 * | 7/2007 | Burns et al. .................. 705/37 |
| 7,412,416 B2 | 8/2008 | Friesen et al. |
| 7,533,056 B2 | 5/2009 | Friesen et al. |
| 7,542,941 B1 * | 6/2009 | Cohen ........................... 705/37 |
| 7,584,142 B1 | 9/2009 | Kline et al. |
| 7,587,357 B1 | 9/2009 | Buck |
| 7,613,651 B1 | 11/2009 | Buck |
| 7,676,411 B2 | 3/2010 | Kemp, II et al. |
| 2001/0034688 A1 | 10/2001 | Annunziata |
| 2001/0039530 A1 | 11/2001 | Annunziata |
| 2002/0023038 A1 | 2/2002 | Fritsch et al. |
| 2002/0055899 A1 | 5/2002 | Williams |
| 2002/0132600 A1 | 9/2002 | Rudrapatna |
| 2002/0138400 A1 | 9/2002 | Kitchen et al. |
| 2002/0138401 A1 | 9/2002 | Allen et al. |
| 2002/0156722 A1 | 10/2002 | Greenwood |
| 2002/0187812 A1 | 12/2002 | Guo |
| 2002/0187813 A1 | 12/2002 | Guo |
| 2003/0008711 A1 * | 1/2003 | Corbo ............................ 463/42 |
| 2003/0009411 A1 | 1/2003 | Ram et al. |
| 2003/0009415 A1 | 1/2003 | Lutnick et al. |
| 2003/0023542 A1 | 1/2003 | Kemp, II et al. |
| 2003/0032453 A1 | 2/2003 | Katz et al. |
| 2003/0055777 A1 | 3/2003 | Ginsberg |
| 2003/0072070 A1 | 4/2003 | Miles |
| 2003/0093360 A1 | 5/2003 | May |
| 2003/0097325 A1 | 5/2003 | Friesen et al. |
| 2003/0120575 A1 | 6/2003 | Wallman |
| 2003/0126069 A1 | 7/2003 | Cha |
| 2003/0139989 A1 | 7/2003 | Churquina |
| 2003/0200167 A1 | 10/2003 | Kemp, II et al. |
| 2003/0222818 A1 | 12/2003 | Regnier et al. |
| 2003/0236737 A1 | 12/2003 | Kemp, II et al. |
| 2004/0041847 A1 | 3/2004 | Lai et al. |
| 2004/0045024 A1 | 3/2004 | Marshall et al. |
| 2004/0064395 A1 | 4/2004 | Mintz et al. |
| 2004/0117292 A1 | 6/2004 | Brumfield et al. |
| 2004/0148249 A1 | 7/2004 | Kinnear |
| 2004/0153391 A1 | 8/2004 | Burns et al. |
| 2004/0157645 A1 | 8/2004 | Smith et al. |
| 2004/0210514 A1 | 10/2004 | Kemp, II et al. |
| 2004/0220871 A1 | 11/2004 | Benning |
| 2004/0225592 A1 | 11/2004 | Churquina |
| 2004/0225593 A1 | 11/2004 | Frankel et al. |
| 2004/0230519 A1 | 11/2004 | Parker |
| 2004/0230520 A1 | 11/2004 | Reding et al. |
| 2005/0055305 A1 | 3/2005 | Lutnick et al. |
| 2005/0068231 A1 | 3/2005 | Regnier et al. |
| 2005/0074033 A1 | 4/2005 | Chauveau |
| 2005/0075966 A1 | 4/2005 | Duka |
| 2005/0170832 A1 | 8/2005 | Cooper |
| 2005/0256799 A1 | 11/2005 | Warsaw et al. |
| 2006/0020538 A1 | 1/2006 | Ram et al. |
| 2006/0026090 A1 | 2/2006 | Balabon |
| 2006/0085759 A1 | 4/2006 | Knapheide |
| 2006/0106713 A1 | 5/2006 | Tilly et al. |
| 2006/0167781 A1 | 7/2006 | Kemp et al. |
| 2006/0259382 A1 | 11/2006 | Kemp et al. |
| 2007/0005481 A1 | 1/2007 | Kedia et al. |
| 2007/0055607 A1 | 3/2007 | Wunsch et al. |
| 2007/0168275 A1 | 7/2007 | Busby |
| 2007/0208604 A1 * | 9/2007 | Purohit et al. .................. 705/9 |
| 2007/0208651 A1 | 9/2007 | Noel |
| 2007/0208654 A1 | 9/2007 | Stearns |
| 2007/0226163 A1 | 9/2007 | Robles |
| 2007/0265953 A1 | 11/2007 | Cunningham et al. |
| 2008/0052220 A1 | 2/2008 | Rutt et al. |
| 2008/0071663 A1 | 3/2008 | Busby |
| 2008/0140559 A1 | 6/2008 | Ram et al. |
| 2008/0162378 A1 | 7/2008 | Levine et al. |
| 2008/0172322 A1 | 7/2008 | Steidlmayer et al. |
| 2008/0306857 A1 | 12/2008 | Busby |
| 2010/0174634 A1 | 7/2010 | Bartko et al. |

FOREIGN PATENT DOCUMENTS

| | | |
|---|---|---|
| WO | WO 98/49639 | 11/1998 |
| WO | WO 99/19821 | 4/1999 |
| WO | WO 99/30259 | 6/1999 |
| WO | WO 99/53424 | 10/1999 |
| WO | WO 00/52619 | 9/2000 |
| WO | WO 00/62187 | 10/2000 |
| WO | WO 00/65510 | 11/2000 |
| WO | WO 01/16830 | 3/2001 |
| WO | WO 01/22315 | 3/2001 |
| WO | WO 01/88808 | 11/2001 |

OTHER PUBLICATIONS

Patricia Lloyd Williams; "E-marketing: Is energy missing the Net?" Public Utilities Fortnightly; Mar. 15, 2000.*

Nash, Nathaniel C. "A New Urgency for Reforms in Policing Securities Trades" Thursday Dec. 17, 1987 New York Times, Col. 1, p. 1, Sec. 1.

Anonymous "CBOT to Create Capital Monitoring Body" Aug. 31, 1990 Lloyds List (LL) p. 3.

Anonymous "Futures regulator brings charges against CBOT" May 25, 1993 Financial Times (FT).

* cited by examiner

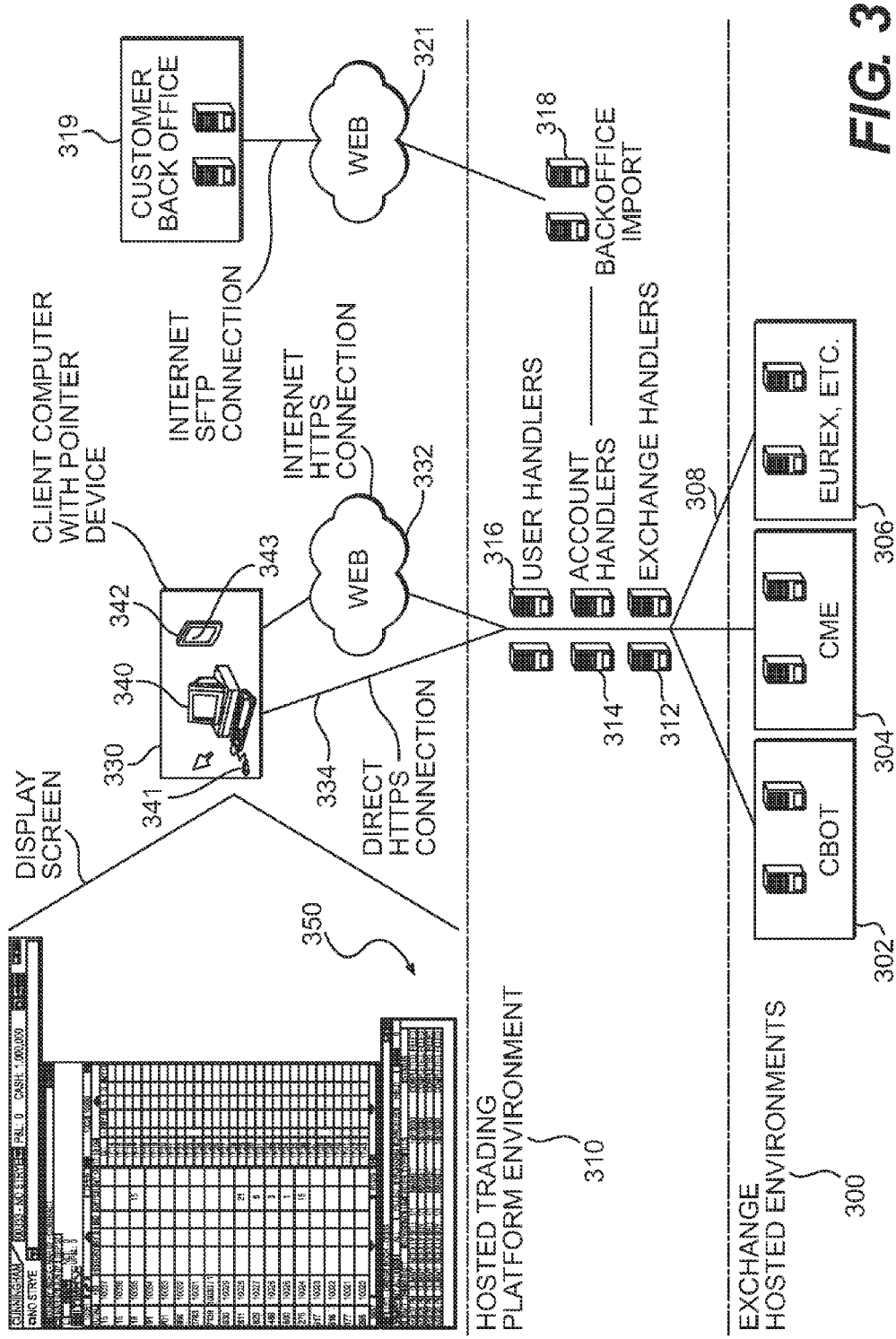

METHOD FOR SCHEDULING FUTURE ORDERS ON AN ELECTRONIC COMMODITY TRADING SYSTEM

CROSS REFERENCE TO RELATED APPLICATIONS

This is a continuation of U.S. patent application Ser. No. 11/624,077, filed Jan. 17, 2007, now abandoned the disclosure of which is incorporated by reference, in its entirety.

REFERENCE TO PREVIOUSLY FILED APPLICATION

The present application hereby incorporates by reference U.S. patent application having Ser. No. 11/431,146, filed May 9, 2006, entitled "Smooth Scrolling for Software Application."

FIELD OF THE INVENTION

The present invention relates to a method of trading commodities over an electronic exchange, and more particularly, to a method for more quickly and efficiently scheduling future buy or sell orders to be executed at precise future dates and times.

BACKGROUND OF THE PRESENT INVENTION

Commodities have been traded in the same way for hundreds of years. The Chicago Board of Trade ("CBOT") began trading commodities in the 1800's. Since the inception of the CBOT, many different exchanges all over the world have been created and trade commodities.

Due to the recent evolution of the internet, electronic commodity trading has become a standard feature of exchanges. This has permitted vast accessibility to various exchanges without requiring that a user be present within the exchange and without the necessity of "paper trades." Not only has the use of electronic trading greatly increased the ability for users to trade commodities, but electronic trading has also increased the volatility of the exchanges, since there are more users that have easier and faster access to the exchanges.

Electronic trading of commodities is achieved through a combination of exchange hosts, internet service providers ("ISPs") and application service providers ("ASPs"). The exchange hosts are primarily responsible for order routing, price dissemination and connectivity.

The ASPs that are utilized in electronic commodities trading are responsible for, among other things, maintaining connectivity, hosts and clients. Connectivity is maintained with respect to exchange hosts through bidirectional communication with redundancy. The hosts are responsible for risk management throughout the trading day as well as the back office integration/imports. Hosts are also responsible for connectivity of the client session management, price dissemination and order routing.

The client is what the user interacts with directly. The client is responsible for connectivity through the Internet or through direct connection to the hosted server environment. The client includes a session management feature which will monitor client connectivity to the hosted server environment. Moreover, the client will typically include a configurable display that includes prices not only of the last trade, but also of the depth of market. The client also allows the user to manipulate orders, keep track of an order book and monitor account status, including balances, profit and loss and positions. Each of the exchanges has requirements in order for the hosts and the clients to participate in the market. While the exchange interface is the same for all participants, the different ASPs and proprietary systems interfaces can and do differ.

Different commodity trading companies typically include a custom trading front-end or platform which each company markets as providing a trading advantage over another commodity trading company. The general advantages an individual trader is seeking are speed and accuracy. Thus, a commodity trading company having a front-end platform that increases speed and accuracy over competing front-end platforms will give that commodity trading company a marketing advantage.

Accordingly, there is a continued need for commodity trading companies to provide features on their front-end platform which enable their users to schedule future trades faster and more accurately than competing commodity trading companies.

OBJECT AND SUMMARY OF THE INVENTION

In view of the foregoing, an object of the present invention is to provide a front-end platform that enables a trader accessing an electronic commodity exchange to more quickly and accurately schedule commodity orders to be executed at specific future times.

In accordance with the present invention, a method is provided for placing a trade order for a commodity on an electronic exchange to be executed at a future time, said method comprising the steps of displaying a trading screen for a commodity market, said trading screen including a future time schedule and an order entry region corresponding to each future time segment of the future time schedule, and scheduling an order corresponding to a future time segment by locating a pointer of a user device within an order entry region corresponding to the future time segment and sending an input signal via the pointer.

The present invention provides a commodity trader with improved efficiency and accuracy in placing and executing trade orders for commodities on an electronic exchange. Other features and advantages of the present invention will become apparent to those skilled in the art from the following detailed description. It should be understood that the detailed description and specific examples, while indicating the preferred embodiment of the present invention, are given by way of illustration and not limitation. Many changes and modifications within the scope of the present invention may be made without departing from the spirit of the invention, and the invention includes all such modifications.

BRIEF DESCRIPTION OF THE DRAWINGS

FIGS. 2a-2g are sequential displays of a front-end platform configured in accordance with the present invention for scheduling orders to be executed at future times; and FIG. 3 illustrates network connections between multiples exchanges and a client in accordance with a preferred embodiment of the present invention.

DETAILED DESCRIPTION OF THE PREFERRED EMBODIMENT

Figure 1:
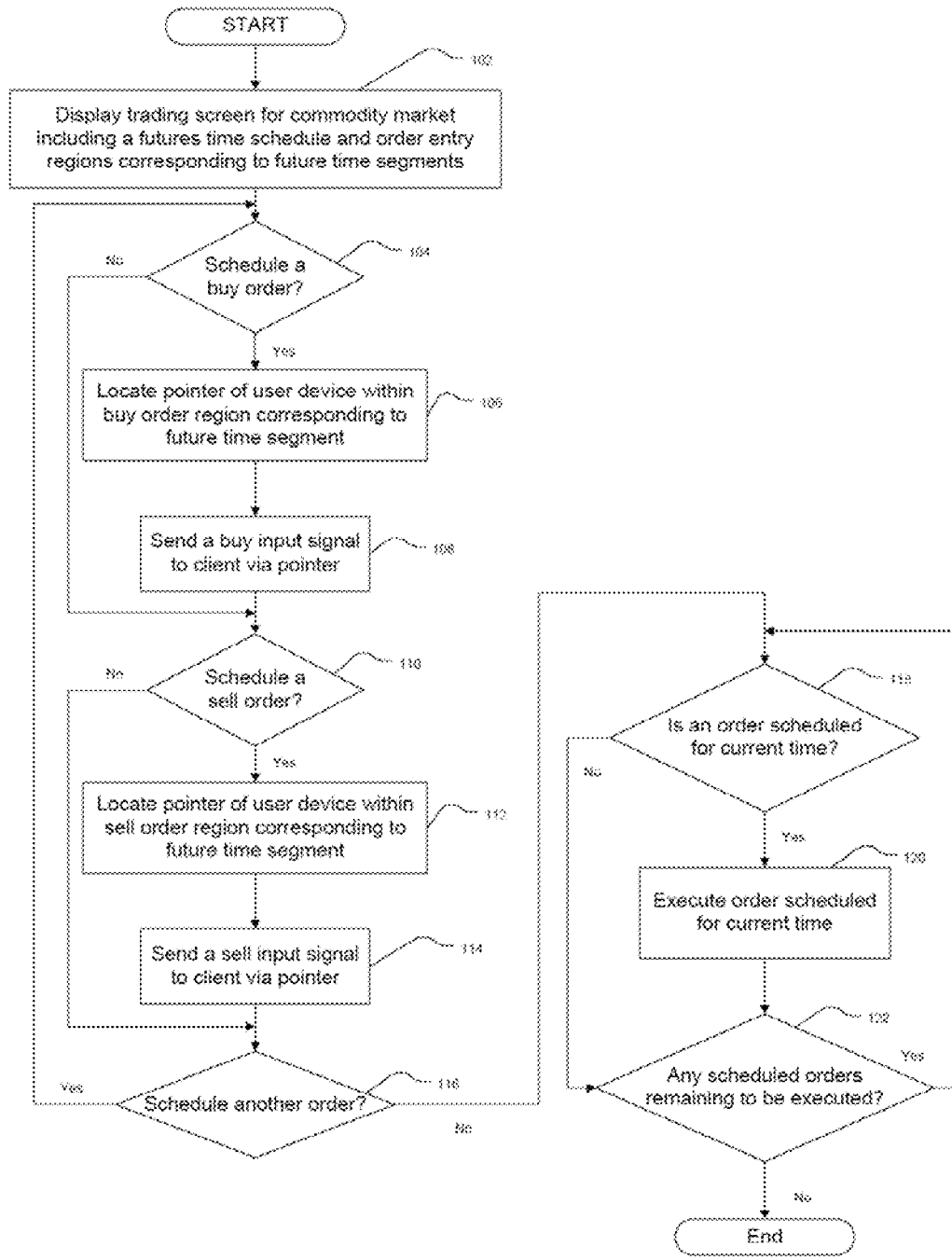
FIG. 1 is a flowchart of a preferred method configured in accordance with the present invention.

Referring now to the drawings, FIG. 1 shows a flowchart of the preferred method configured in accordance with the present invention. In the preferred embodiment, the method of the present invention is implemented on a computer or electronic terminal. The computer is able to communicate directly or indirectly via intermediate devices with an exchange to receive and transmit market, commodity, and trading order information. The present invention is preferably implemented on any existing or future terminal or device with the processing capability to perform the functions described herein. The scope of the present invention is not limited to the type of terminal or device used. Furthermore, the present invention is not necessarily used on the internet.

The description refers to a single click of a mouse or other input device as means for a user to interact with a terminal display. While a mouse is a preferred method of interacting with the terminal display of the present invention, the scope of the present invention is not limited to the use of a mouse as an input device or to the click of a mouse button as a user's single action. Instead, any action by a user of the present invention, whether including one or more clicks of a mouse button or other input device, is considered a single action or step of the user for purposes of the present invention.

Turning to flowchart 100, the preferred method of the present invention begins at step 102 where a computer screen implementing the present invention displays a trading screen for a commodity market, such as the Chicago Board of Trade (CBOT). The displayed trading screen includes a futures time schedule and order entry regions corresponding to future time segments.

Next, at step 104, the method checks to determine whether a user desires to schedule a buy order at a specific future time. In order to schedule a future buy order, a user simply locates a display pointer, such as a mouse arrow, within a buy order region corresponding to a specific future time, and makes a single click on his or her input device, such as a mouse. These buy order steps are illustrated in steps 106 and 108 of the flowchart 100. The method then moves to step 110 to determine if the user is inputting a request to schedule a sell order. If no buy order is being inputted by the user at step 104, then method moves directly to step 110 to determine if the user is inputting a request to schedule a sell order.

To schedule a future sell order at step 110, the user simply locates the display pointer within a sell order region corresponding to a specific future time and makes a single click on the input device. These steps are illustrated in steps 112 and 114 of the flowchart 100. The method then moves to step 116 to determine if the user is requesting to schedule another future order via the input device by locating the pointer within the buy or sell order regions. Also, if no sell order is being inputted by the user at step 110, then the method moves directly to step 116 to determine if the user is requesting to schedule any more orders whether they be buys or sells.

If a new future buy or sell order is not being requested by the user by locating the pointer within the schedule buy order region or schedule sell order region of the displayed trading screen, the method then checks to determine if an order has been scheduled for the current time at step 118. If no order has been scheduled for the current time, then the method goes directly to step 122 to check if any other orders have been scheduled. If an order has been scheduled for the current time at step 118, then the method moves to step 120 to execute the buy or sell order scheduled to the current time. Afterwards, the method moves to step 122 to determine if any scheduled orders remain to be executed.

At step 122, if any scheduled future orders remain to be executed, the method returns to step 118. If no orders remain to be executed, then the method has processed all the scheduled orders.

Figure 2A:
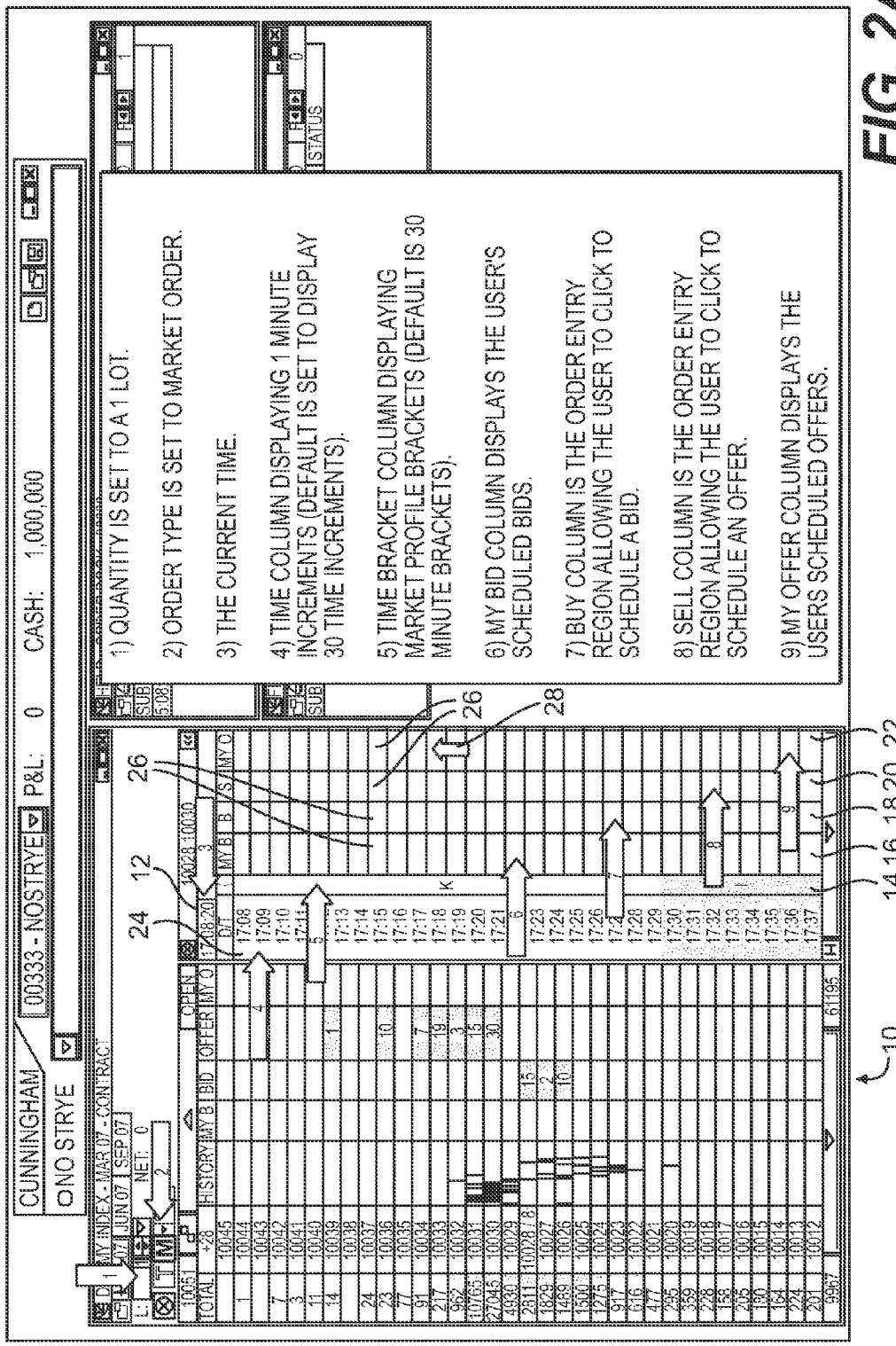

Referring now to FIGS. 2a-2f, these drawings illustrate in sequential order the process of scheduling a future order on a commodity exchange in accordance with the present invention. Referring first to FIG. 2a, shown is a commodity trading display 10 for a front-end platform configured in accordance with the present invention. In accordance with the present invention, the display 10 includes at least six columns: time 12, market profile bracket 14, my bid or my buy order status 16, schedule buy order region 18, schedule sell order region 20, and my offer or my sell status 22. Under the default configuration, the time column 12 lists one minute time increments from the present time to thirty minutes in the future. The intersection between the columns 12,14,16,18,20,22 and the time segments or time increments 24 create cells 26. The cells 26 within the buy (bid) 18 and sell (offer) 20 columns are the order entry regions that accept user input when a pointer 28 is located within these regions and a user clicks on his computer mouse or other input device to trigger the submission of activation order to a computer server. A trader may cancel an order by locating his or her pointer 28 within cell 26 of my bid 16 or my offer 22 corresponding to a previously activated or scheduled buy or order region 18,20 and clicking on his or her input device.

The buy and sell order regions 18 and 20, respectively, are horizontally aligned with the time increments 24 displayed within the time column 12. Clicking on an order entry region 18,20 provides final order parameters required to submit a time activation order consisting of time and buy/sell. All other order parameters are pre-specified in other areas of the front-end platform outside the time activation component. Such parameters include quantity, order type (limit, stop, stop limit), clearing instruction rules, market, and account.

The market profile bracket column 14 displays a character that represents a bracket of time. These brackets of time are configurable as commodity traders desire to see different commodities, and different commodity markets have different trading schedules. The concept of market profile brackets is an industry standard, however, displaying the market profile brackets in a column 14 makes it easier for time based traders to schedule orders based on what other market profile based tools are telling the traders. The working bids and offers columns 16,22 display the total quantity of orders scheduled to be bought or sold at the corresponding time interval 24 in the time column 12.

Display 10 illustrates the status of a user's account before any future buy or sell orders have been schedule. FIG. 2a also includes explanation arrows #1-9 to illustrate different areas of the display screen 10. Explanation arrow #1 shows that the order quantity has been set to 1 lot. Thus, each time a trader places his pointer 28 in a buy order region 18 and single clicks his or her mouse, a buy order for 1 lot will be scheduled. If the lot quantity was set to two, then each single click of the mouse would schedule two lot orders. Explanation arrow #2 indicates that the order type is a market order. Thus, each click of the mouse by a user when the pointer is within an order region will schedule a market order. The type of order can be changed to a limit or stop limit order. Explanation arrow #3 shows where the current time is displayed. Explanation arrow #4 illustrates the time segments or increments, and explanation arrow #5 shows the market profile brackets, whose default is set to thirty minute brackets. Explanation arrow #6 shows the buy order status column 16, and explanation arrow #7 shows the schedule buy order region 18. Explanation arrow #8 shows schedule sell order region 20, and explanation arrow #9 shows the sell order status 22.

Figure 2B:
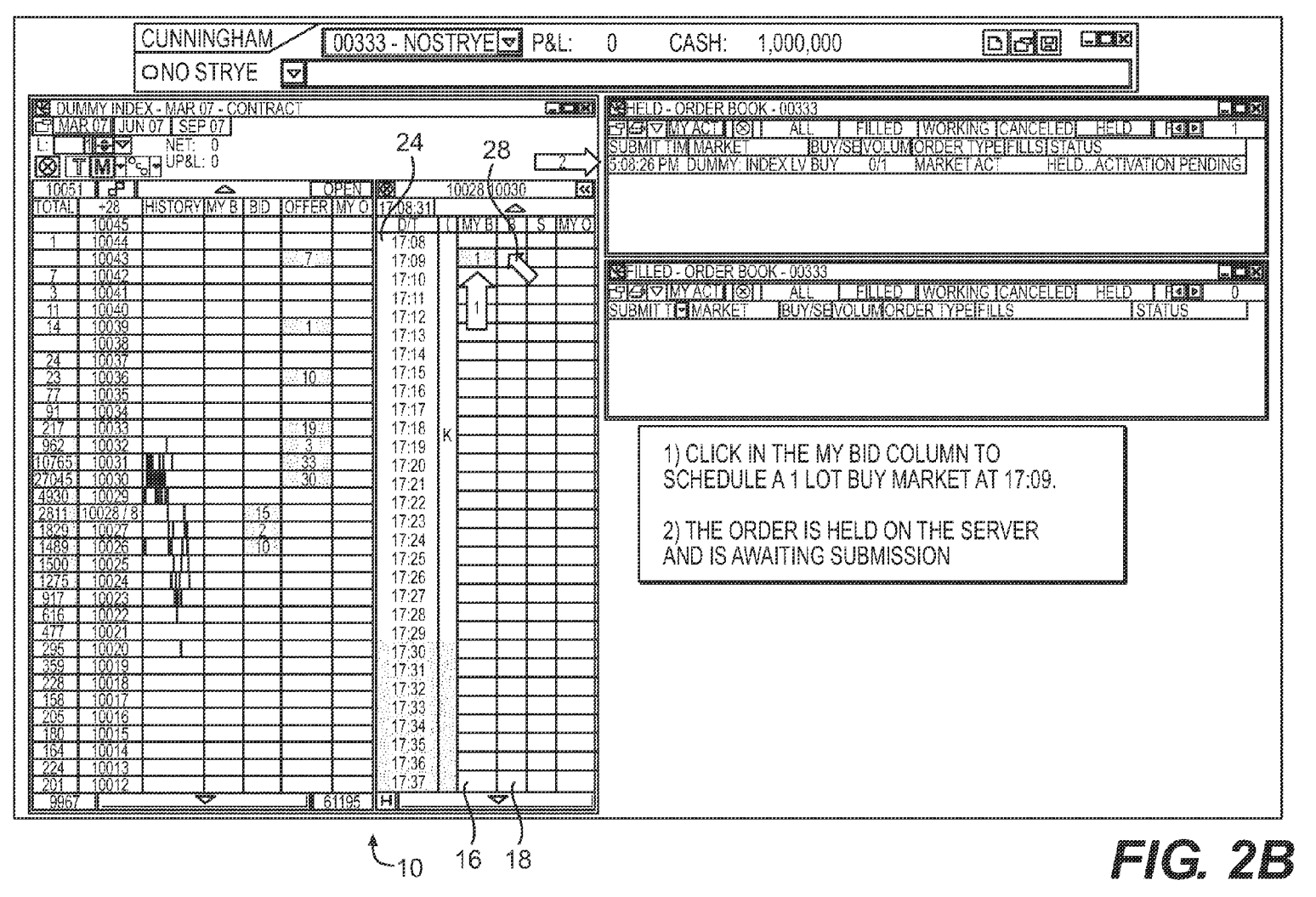

FIG. 2b. shows the display 10 after a buy for one lot has been scheduled for 17:09 by placing pointer 28 and clicking in a cell 26 of the order buy region column 18, as shown by explanation arrow #1. Explanation arrow #2 shows that the buy order is being held on the server and is awaiting submission.

Figure 2C:
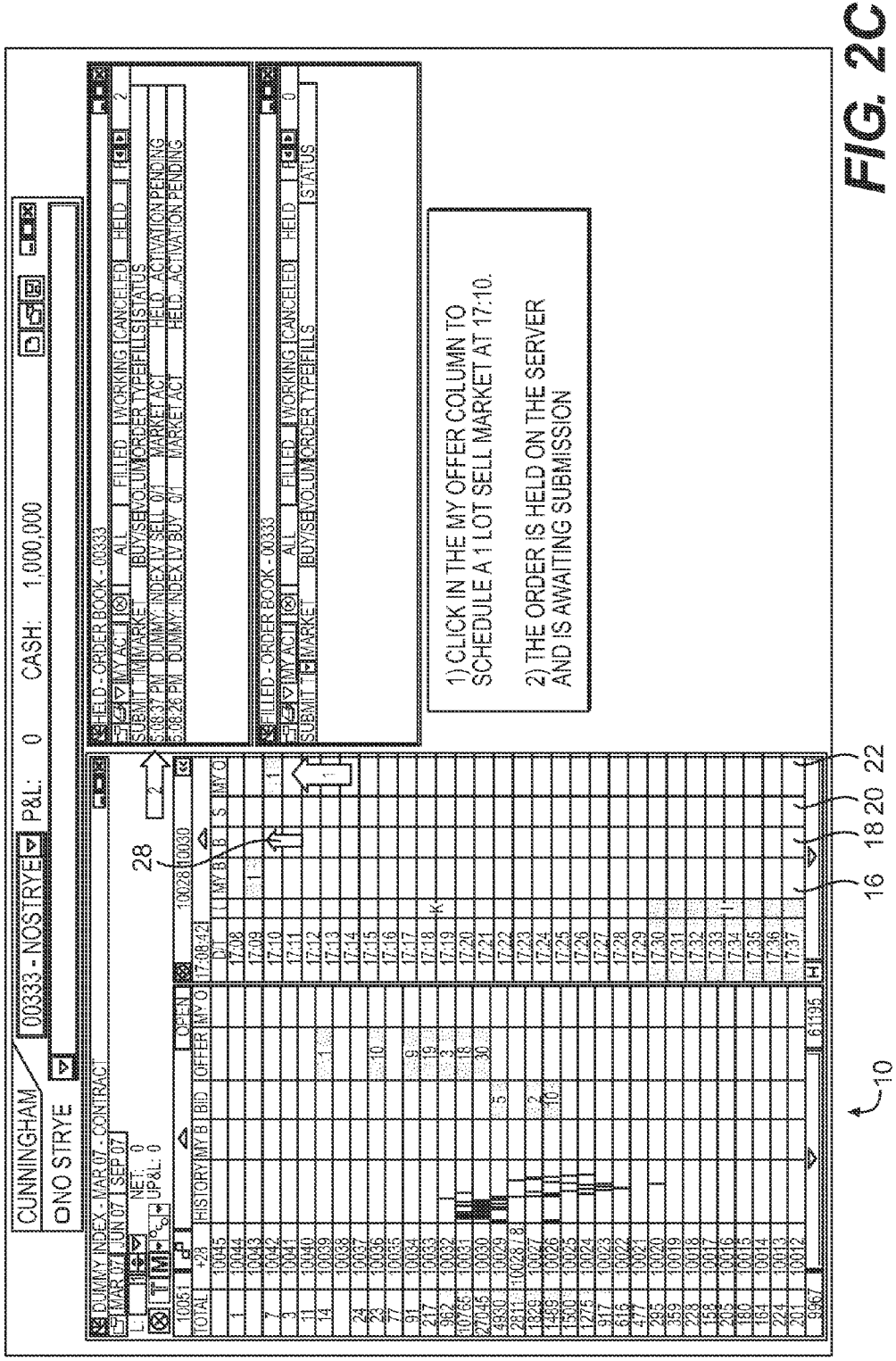

FIG. 2c. illustrates the display 10 after a sell order for one lot has been scheduled for 17:10 by placing pointer 28 and clicking in a cell 26 of the schedule sell order region 20, as shown by explanation arrow #1. Explanation arrow #2 shows that the sell order is being held on the server and is awaiting submission.

Figure 2D:
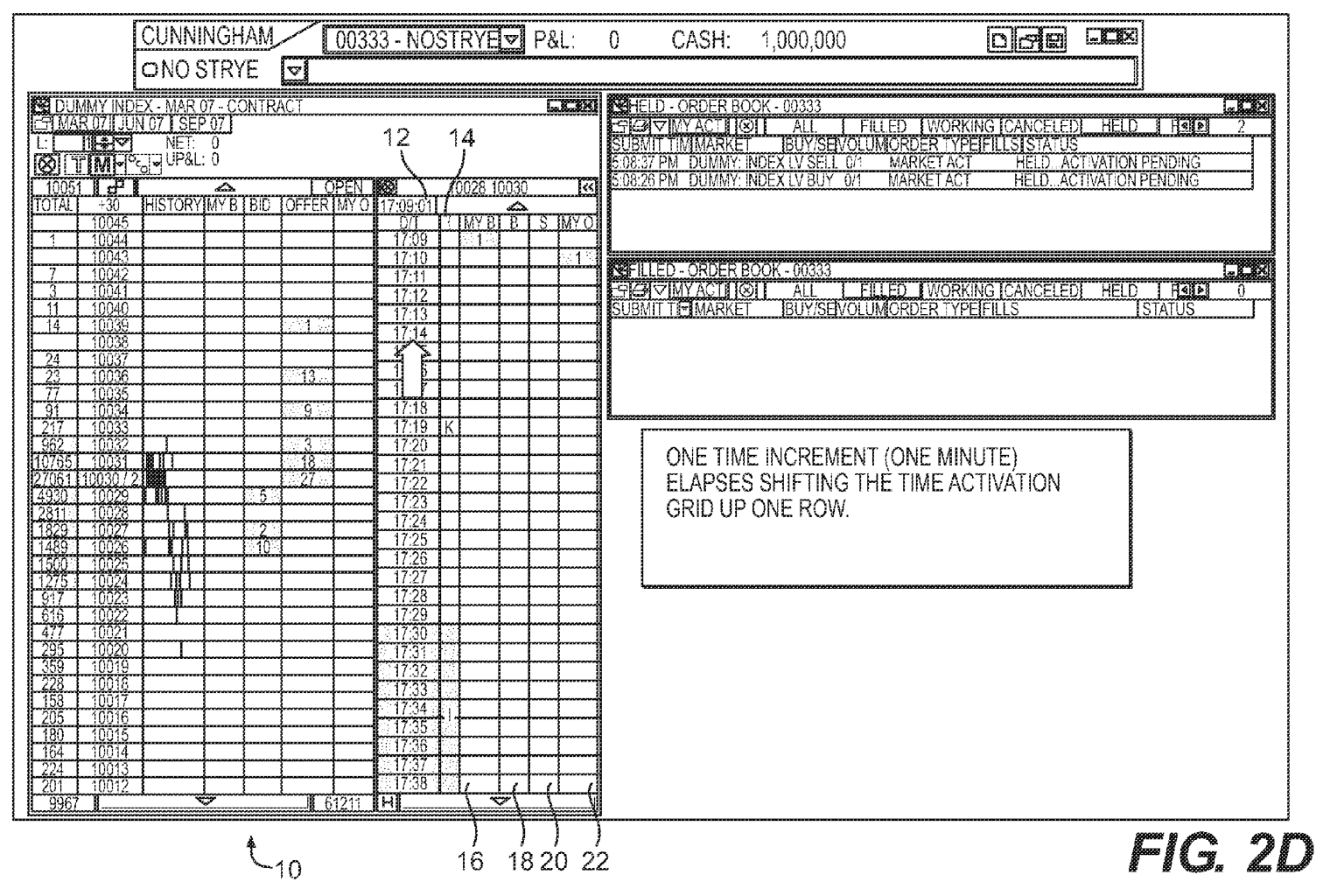

FIG. 2d shows that one time increment, in this example one minute, has elapsed thus shifting all of the columns 12,14,16, 18,20,22 up one row.

Figure 2E:
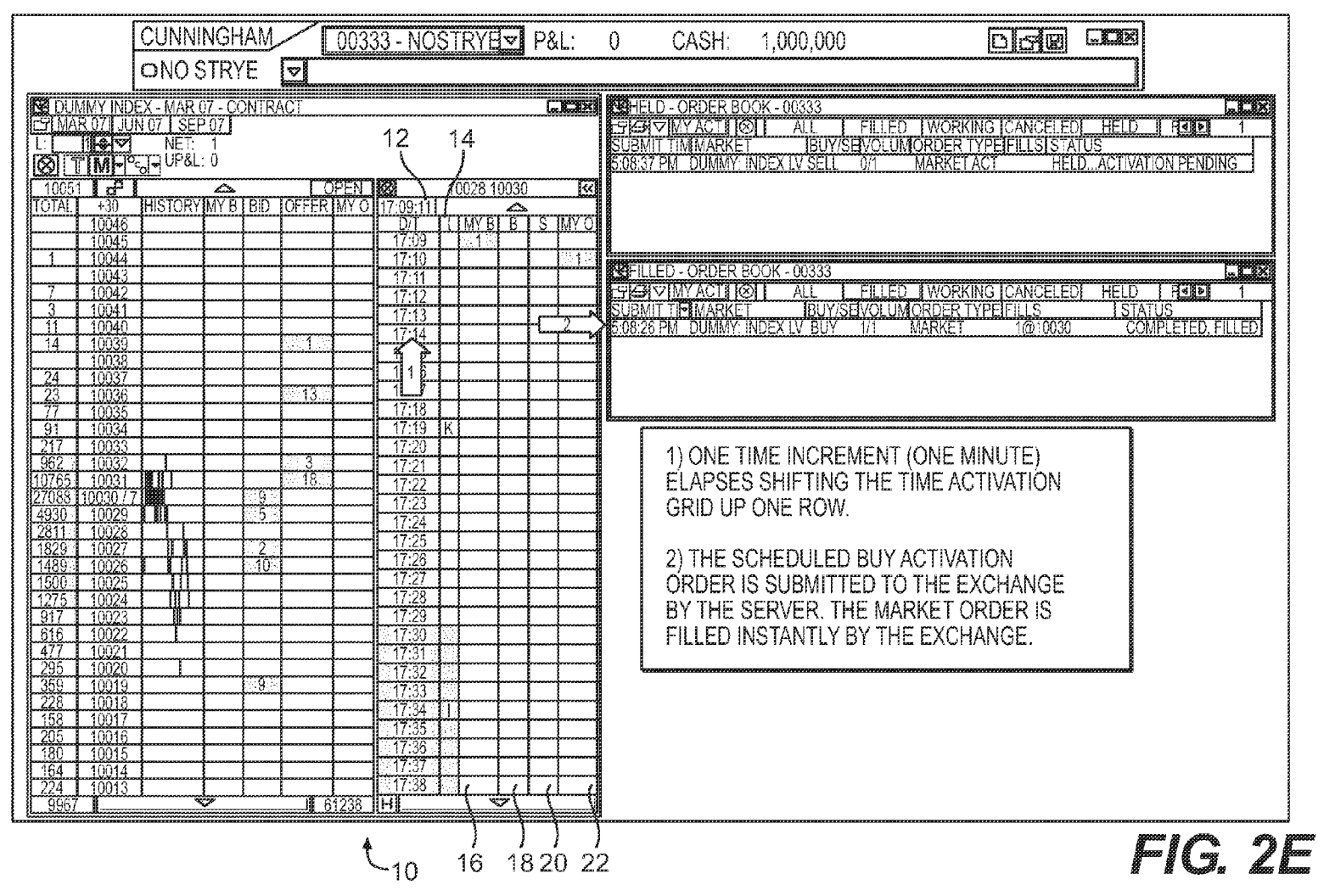

FIG. 2e shows another time increment (one minute) has elapsed since FIG. 2d, as illustrated by explanation arrow 1, thus shifting all the columns 12,14,16,18,20,22 up, one row. Furthermore, explanation arrow #2 shows that the scheduled buy order for 17:09 has now executed and filled, as 17:09 is now the current time.

Figure 2F:
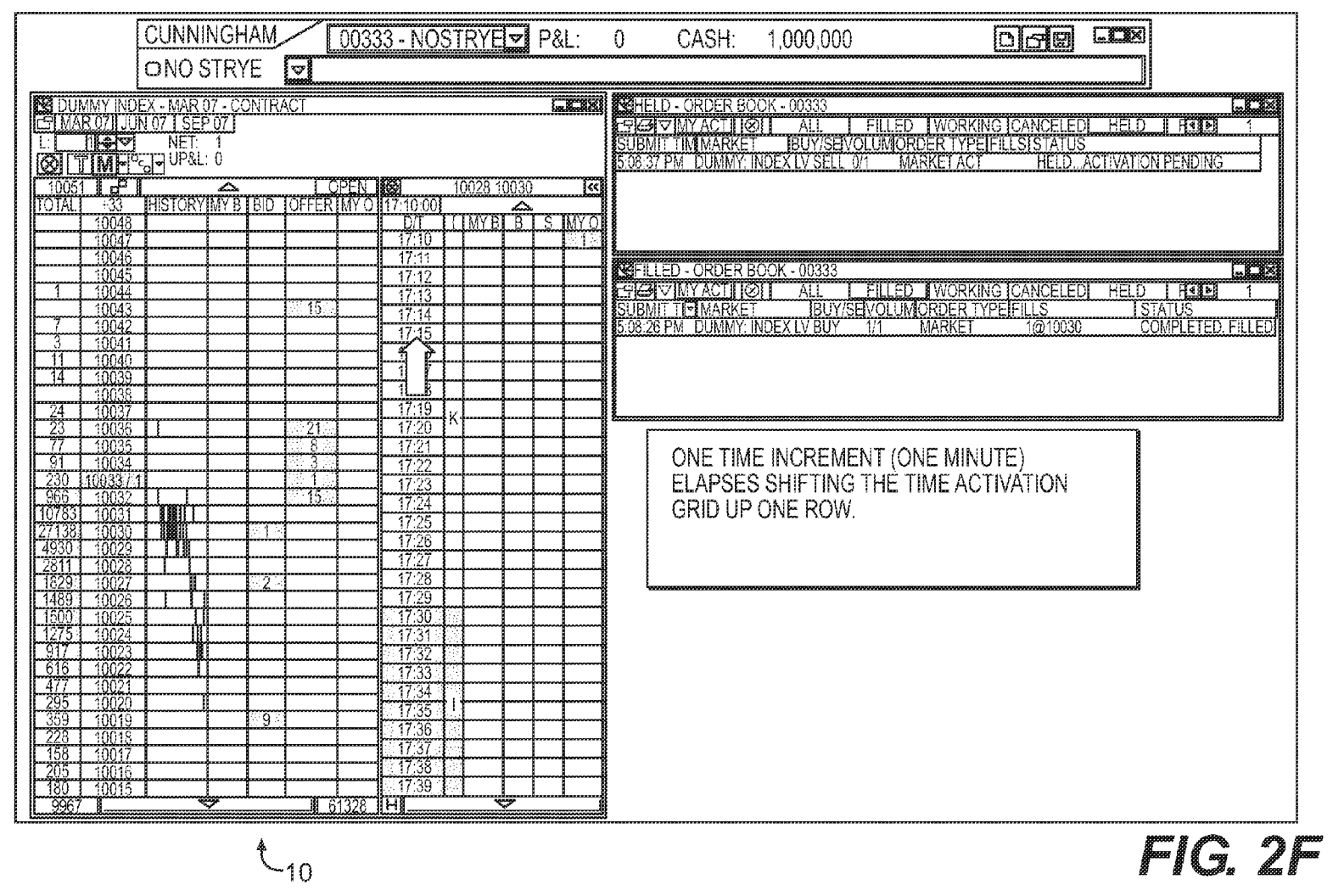

FIG. 2f shows another time increment (one minute) has elapsed since FIG. 2e, thus shifting all of the columns 12,14, 16,18,20,22 up by one row.

Figure 2G:
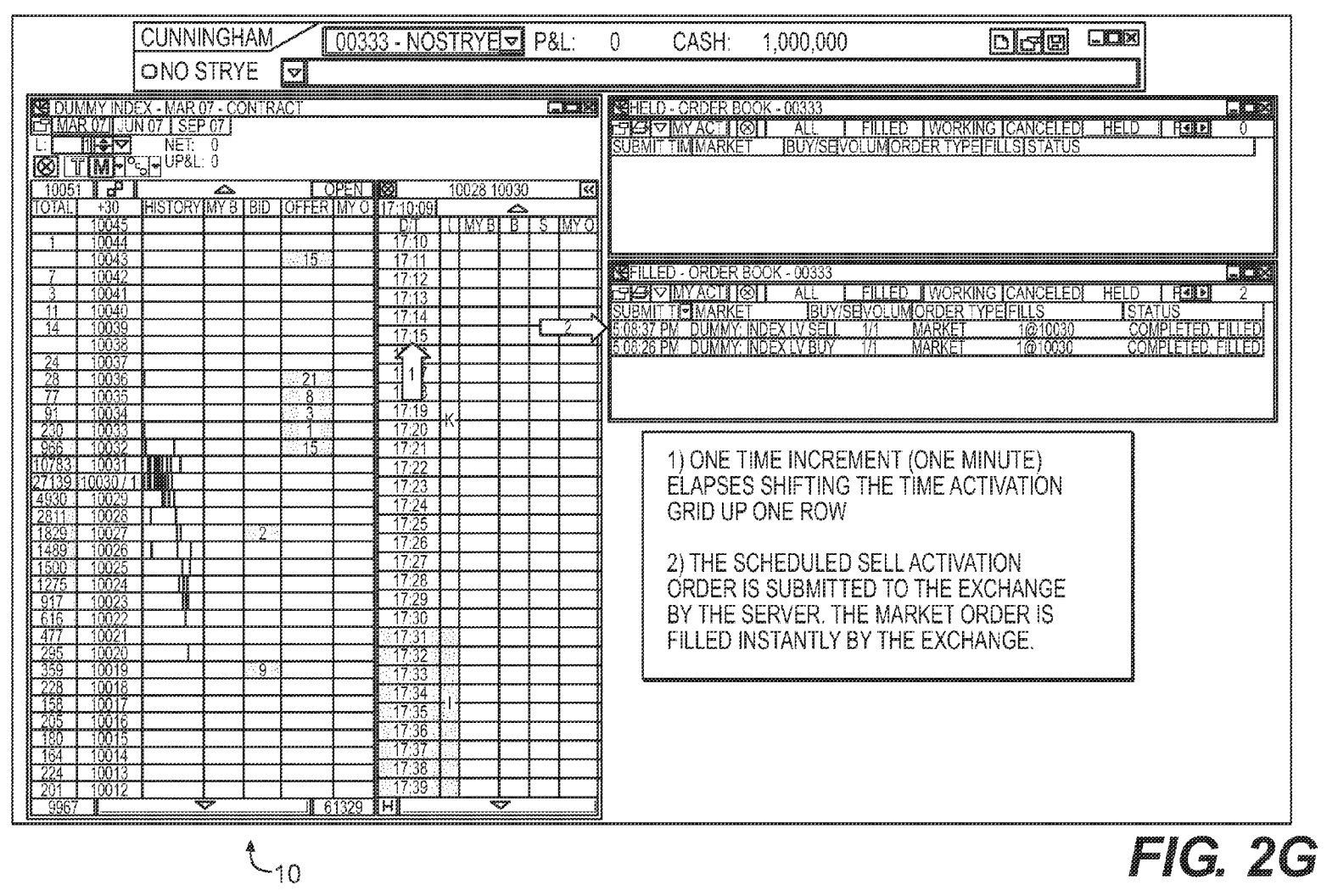

FIG. 2g shows another time increment (one minute) has elapsed since FIG. 2f, as illustrated by explanation arrow 1, thus shifting all the columns up by one row. Furthermore, explanation arrow #2 shows that the scheduled sell order for 17:10 has now executed and filled, as 17:10 is now the current time.

FIG. 3 illustrates a network connection between multiple exchanges and a client configured in accordance with a preferred method of the present invention. Several exchange hosted environments are illustrated, including the Chicago Board of Trade (CBOT) 302, the Chicago Mercantile Exchange (CME) 304, and the European Electronic Exchange (Eurex) 306. The various exchange hosted environments 300 are connected to a hosted trading platform environment 310 via direct copper or fiber connection 308. Specifically, the exchange hosted environments 302, 304, and 306 interface directly with exchange handlers 312 via the direct connections 308. Software applications for use with the hosted trading platform environment 310 of the present invention also preferably include a server component. The server component is preferably an n-tier distributed application that is designed to be robust, secure and scalable. The server preferably consists of a number of tiers, including an exchange handler 312, an account handler 314, and a user handler 316. Each of the handlers 312, 314, 316 can be run on separate servers, or they can all be run on the same server, or any combination thereof. Multiple instances of each tier can be run at the same time to achieve load balancing and failover redundancy. Each tier communicates with the others using messages sent over TCP/IP sockets, multicast or Microsoft Message Queue services.

The exchange handler 314 typically deals with the communication with the actual futures exchanges, such as CBOT 302, CME 304, and Eurex 306. This tier effectively provides a common interface for the rest of the applications to communicate with different exchange technologies (such as LIFFE Connect, FIX, etc.). For each exchange that the system communicates with, a driver is typically created that deals with the translation between that specific exchange application program interface (API) and the varying data formats of the software application. The driver updates caches of information within the exchange handler 316 with updates to that market data, quotes or orders. The exchange handler 316 typically then deals with forwarding that information onto the account handlers 314 and user handlers 316 based on what information they have subscribed to receive.

The account handler 314 is preferably at the core of the system holding all account related information including orders for the current day. The orders submitted by a user are typically sent through the account handler 314 and checked for various risk management parameters, such as maximum size, margin requirement, etc., before being sent to an exchange handler 312 for sending to the actual exchange. When an order is confirmed by an exchange, or is filled or cancelled, the message is forwarded from the exchange, via the exchange handler 312, to the account handler 314, where the order record is updated to reflect the new state of the order. The updated order state is then sent to the end-user via the user handler 316.

Servers for use with the present invention preferably include a user handler 316. The user handler 316 typically deals with the connections established by the end-users with the front-end, typically via the API. Access to the system by an end-user is preferably achieved through this component. The user handler 316 preferably maintains a secure connection with a client 330 via SSL encryption over an internet HTTPS connection 332 or a direct HTTPS connection 334, which enables authentication of the user of client 330 and the permissions that the user of client 330 has been assigned. It is contemplated that other means of maintaining a secure connection and authenticating users and permission may be implemented as would be appreciated by those of ordinary skill in the art.

Quote data from the exchanges and the order and trade confirms from the account handler 314 are preferably forwarded through the user handler 316 to the end-users depending on the data that each user has subscribed to. Orders submitted and requests for data from the end-user are typically processed through the user handler 316 first, and then forwarded to the appropriate account handler or exchange handler.

It is advantageous to have many instances of the user handler 316 tier, preferably on multiple machines, which would allow for hundreds or thousands of users to be connected to the system at the same time. If one instance failed, the users connected to it would automatically reconnect to another instance causing minimal outage time for the end-user.

The backoffice import 318 allows users via a client computer 330 to export account details (number, name, balance, etc.) and statements to a company providing the hosting platform. This export is in the form of a FTP or SFTP. The hosted trading platform environment 310 preferably adds or updates account details and publishes statements on the web in the form of PDF's so that a user on a client computer 330 can access all their account related information from the company providing the hosted trading platform 310 via the web. The customer back office 319 provides a source for the SFTP to the back office import 318 via the internet 321.

A client computer 330 interfaces the user handler 316 of the hosted trading platform via the internet 332 or a direct connection 334. A client computer 330 is preferably a desktop computer 340 having a mouse 341 as an input device. In another embodiment the client computer 330 may be user a flat panel touch pad computer 342 using a touch pen 343 as an input device. Of course, other types of client computers and input devices may be used with the present invention to display and make inputs on the trading screen 350.

It should be understood that the above description of the present invention and preferred embodiment are given by way of description and illustration, and not limitation. Many changes and modifications within the scope of the present invention may be made without departing from the spirit of the present invention, and the present invention includes all such changes and modifications.

We claim as our invention:

1. A method for placing a trade order for a commodity on an electronic exchange to be automatically executed at a future time, said method comprising the steps of:
    displaying a trading screen for a commodity market, said trading screen including:
        a future time schedule, wherein the time schedule includes a plurality of future time segments; and,
        an order entry region corresponding to each future time segment of the future time schedule, the order entry region horizontally aligned with each future time segment, the future time segments automatically scrolling as time passes, wherein automatically scrolling further includes:
            determining that a time increment has elapsed,
            shifting future time segments, and,
            maintaining horizontal alignment between the order entry region and each future time segment;
    scheduling an order corresponding to a particular future time segment by locating a pointer of a user device within an order entry region corresponding to the particular future time segment and sending an input signal via the pointer; and,
    automatically initiating execution of the order with a commodity exchange based on a current time matching a time of the scheduled order associated with the particular future time segment, and updating the order entry region associated with the particular future time segment.

2. The method of claim 1, wherein the order comprises a buy order and the order entry region is a buy order entry region.

3. The method of claim 1, wherein the order comprises a sell order and the order entry region is a sell order entry region.

4. The method of claim 1, wherein the order comprises a buy order, the method further comprising the step of:
    scheduling a buy order corresponding to a future time segment by locating the pointer of a user device within a buy order entry region corresponding to the future time segment and sending an input signal via the pointer.

5. The method of claim 1, wherein the order comprises a sell order, the method further comprising the step of:
    scheduling a sell order corresponding to a future time segment by locating the pointer of a user device within a sell order entry region corresponding to the future time segment and sending an input signal via the pointer.

6. The method of claim 1, wherein future time segments of the trading screen are chronologically incremented in equal time segments.

7. The method of claim 1, wherein the trading screen includes a grid of columns and rows, wherein at least some of the rows correspond to future time segments, and a column is designated as a buy column and another column is designated as a sell column.

8. The method of claim 7, wherein said grid comprises cells corresponding to buy order entry regions and cells corresponding to sell order entry regions.

9. The method of claim 1, wherein the user device comprises a mouse associated with a computer.

10. The method of claim 9, wherein the input signal is initiated by pressing an input button on the mouse.

11. The method of claim 9, wherein the pointer of a user device comprises a display arrow associated with the mouse.

12. A computer readable medium having program code recorded thereon for execution on a computer for placing a trade order for a commodity on an electronic exchange to be executed at a future time, said program code causing a machine to execute, the method comprising the steps of:
    displaying a trading screen for a commodity market, said trading screen including:
        a future time schedule, wherein the time schedule includes a plurality of future time segments; and,
        an order entry region corresponding to each future time segment of the future time schedule, the order entry region horizontally aligned with each future time segment, the future time segments automatically scrolling as time passes, wherein automatically scrolling further includes:
            determining that a time increment has elapsed,
            shifting future time segments, and,
            maintaining horizontal alignment between the order entry region and each future time segment;
    scheduling an order corresponding to a particular future time segment by locating a pointer of a user device within an order entry region corresponding to the particular future time segment and sending an input signal via the pointer; and,
    automatically initiating execution of the order with a commodity exchange based on a current time matching a time of the scheduled order associated with the particular future time segment, and updating the order entry region associated with the particular future time segment.

13. The method of claim 1, wherein the step of scheduling an order includes scheduling a trade order for a commodity.

* * * * *